United States Patent
Fairchild et al.

(10) Patent No.: US 12,506,553 B2
(45) Date of Patent: Dec. 23, 2025

(54) SCIENTIFIC SYSTEM AND METHOD FOR OPTIMIZING TELEVISION ADVERTISING

(71) Applicant: tvScientific, Inc., Pasadena, CA (US)

(72) Inventors: Jason Fairchild, Rolling Hills Estates, CA (US); David Koye, Richmond, VA (US)

(73) Assignee: tvScientific, Inc., El Segundo, CA (US)

( * ) Notice: Subject to any disclaimer, the term of this patent is extended or adjusted under 35 U.S.C. 154(b) by 0 days.

(21) Appl. No.: 18/795,121

(22) Filed: Aug. 5, 2024

(65) Prior Publication Data

US 2024/0396654 A1 Nov. 28, 2024

Related U.S. Application Data

(63) Continuation of application No. 18/336,919, filed on Jun. 16, 2023, now Pat. No. 12,057,926, which is a
(Continued)

(51) Int. Cl.
*H04N 21/81* (2011.01)
*H04H 60/37* (2008.01)
(Continued)

(52) U.S. Cl.
CPC .......... *H04H 60/73* (2013.01); *H04H 60/375* (2013.01); *H04H 60/47* (2013.01); *H04H 60/63* (2013.01); *H04N 21/812* (2013.01)

(58) Field of Classification Search
CPC ........................ H04N 21/812; H04N 21/466
See application file for complete search history.

(56) References Cited

U.S. PATENT DOCUMENTS 8,904,418 B1 12/2014 Rowe
9,232,252 B2 * 1/2016 Eldering .......... H04N 21/23424
(Continued)

FOREIGN PATENT DOCUMENTS

WO 2012144825 A2 10/2012
WO 2017019646 A1 2/2017

OTHER PUBLICATIONS

EPO Communication Extended European Search Report, Application No. 22782254.1 tvScientific, Inc., mail date Jun. 25, 2024, 10 pgs.
(Continued)

*Primary Examiner* — Michael H Hong
(74) *Attorney, Agent, or Firm* — PATENT LAW WORKS LLP

(57) ABSTRACT

A scientific system and methods are disclosed for optimizing television (e.g., "CTV" and "OTT") advertising and related expenditure to maximize efficiency and return on investment ("ROI") for advertisers. The scientific system comprises an initial-feedback engine that develops and refines creatives or outcomes by creating and using an artificial intelligence ("AI") engine that creates an initial feedback loop from social media platforms and subsequently uses an intelligent advertisement-selection engine that takes the highest performing advertising on the social media platforms and directs or imports them for connected television or over-the-top advertising. The system includes a performance engine that optimizes performance of the connected television and over-the-top advertising and then moves the winning combination of a creative or outcome resulting from the application inventory, the audience segment, the part of day, the frequency or the like to linear television purchase actions.

20 Claims, 5 Drawing Sheets

Related U.S. Application Data continuation of application No. 17/710,396, filed on Mar. 31, 2022, now Pat. No. 11,683,109.

(60) Provisional application No. 63/169,119, filed on Mar. 31, 2021.

(51) Int. Cl.
*H04H 60/47* (2008.01)
*H04H 60/63* (2008.01)
*H04H 60/73* (2008.01)

(56) References Cited

U.S. PATENT DOCUMENTS

| | | | |
|---|---|---|---|
| 10,789,619 | B1 | 9/2020 | Kahrl |
| 11,405,671 | B2 * | 8/2022 | Smith .............. H04N 21/44224 |
| 2001/0054026 | A1 | 12/2001 | Choate |
| 2004/0107137 | A1 | 6/2004 | Skinner |
| 2006/0169769 | A1 | 8/2006 | Boyarsky |
| 2008/0066107 | A1 | 3/2008 | Moonka |
| 2009/0170614 | A1 | 7/2009 | Herrmann |
| 2009/0259518 | A1 | 10/2009 | Harvey |
| 2012/0116868 | A1 | 5/2012 | Chin |
| 2012/0254149 | A1 | 10/2012 | Ramsay |
| 2013/0014223 | A1 | 1/2013 | Bhatia |
| 2013/0166375 | A1 | 6/2013 | YoungLincoln |
| 2013/0339111 | A1 | 12/2013 | Ross |
| 2014/0052546 | A1 | 2/2014 | Phan |
| 2014/0171199 | A1 | 6/2014 | David |
| 2014/0237498 | A1 | 8/2014 | Ivins |
| 2014/0282655 | A1 | 9/2014 | Roberts |
| 2014/0351041 | A1 | 11/2014 | Brown |
| 2015/0220999 | A1 | 8/2015 | Thornton |
| 2015/0238865 | A1 | 8/2015 | Jeong |
| 2015/0348119 | A1 | 12/2015 | Ferber |
| 2016/0019587 | A1 | 1/2016 | Hueter |
| 2016/0132936 | A1 | 5/2016 | Hertel |
| 2016/0162940 | A1 | 6/2016 | Kang |
| 2016/0191962 | A1 | 6/2016 | Buddha |
| 2017/0034593 | A1 | 2/2017 | Ray |
| 2017/0118533 | A1 | 4/2017 | Holtz |
| 2017/0161793 | A1 | 6/2017 | Knapp |
| 2017/0169462 | A1 | 6/2017 | Meredith |
| 2017/0372356 | A1 | 12/2017 | Frommann |
| 2018/0343495 | A1 | 11/2018 | Loheide |
| 2019/0251603 | A1 | 8/2019 | Jaatinen |
| 2019/0379924 | A1 | 12/2019 | Massoudi |
| 2020/0279626 | A1 | 9/2020 | Ansari |
| 2021/0144426 | A1 | 5/2021 | Navarre |
| 2021/0185407 | A1 | 6/2021 | Marshall |
| 2021/0258654 | A1 | 8/2021 | Kurzynski |
| 2022/0092638 | A1 | 3/2022 | Shankel |

OTHER PUBLICATIONS

International Search Report and Written Opinion for International Application No. PCT/US2022/022942, mailed Aug. 9, 2022, 15 pgs.

Yuan, Shuai, et al. "Internet Advertising: An Interplay among Advertisers, Online Publishers, Ad Exchanges and Web Users", p. 8, Department of Computer Science, University College London (2012).

* cited by examiner

SCIENTIFIC SYSTEM AND METHOD FOR OPTIMIZING TELEVISION ADVERTISING

CROSS-REFERENCE TO RELATED APPLICATION

This application is a continuation and claims priority to U.S. application Ser. No. 18/336,919, entitled "Scientific System and Method for Optimizing Television Advertising" filed Jun. 16, 2023, which is a continuation and claims priority to U.S. application Ser. No. 17/710,396, entitled "Scientific System and Method for Optimizing Television Advertising" filed Mar. 31, 2022, which claims priority under 35 USC § 119(e) to U.S. Provisional Application No. 63/169,119, entitled "Scientific System and Method for Optimizing Television Advertising" filed on Mar. 31, 2021, the entirety of which application is herein incorporated by reference.

BACKGROUND

1. Field of the Invention

The present invention relates to paid content or advertisement ("ad") placement for connected television viewing over the internet. More particularly, the present invention relates to a system and methods for a scientific system and method for optimizing paid content or advertising on television.

2. Description of the Related Art

As is well known, "Linear TV" refers to the traditional television system in which a viewer watches a scheduled TV program at the time it's broadcast and on its original channel. It also can be recorded via DVR (digital video recorder) and watched later. The viewer typically watches content through regular programming or by paying for a cable or satellite subscription. With the popularity and use of the Internet for streaming content, connected television or "CTV" and over-the-top delivery mechanisms ("OTT") use have grown dramatically in recent years. A connected television is a device that can connect to a television or a smart television that facilitates the delivery of streaming video content over the internet. A "smart" television is a television with a built-in internet connection and media platform. No additional equipment is required to stream videos. Instead, videos are most often streamed via apps that are downloaded. Other connected devices that connect directly to a traditional television (not a smart television) and the internet and enable apps that are downloaded for viewing videos include game consoles (e.g., Nintendo switch, Xbox, PlayStation) and other connected devices (Roku, Amazon Figure TV, Apple TV, Chromecast), and more. Gaming consoles act as the connected device that provide access to apps from their app stores. With this growth there has been an equally dramatic growth and migration to online advertising. For consumers, connected television or "CTV" is a different way to watch TV across multiple types of screens with no cable or satellite subscription required. For advertisers, it's an innovative way to reach a new and unique audience. However, connected television advertising presents a complex eco-system involving a complicated interplay between several entities, including content providers, advertisers (both informed and uninformed), and users or viewers who browse the internet to view all types of downloadable content available that are of interest to them.

With connected television advertising, advertisers can typically reach television viewers that advertisers cannot reach without traditional television commercials. Superior targeting capabilities involve connected television audience targeting, by which companies can be sure that marketing dollars are going towards the most valuable and targeted viewers. In this industry, programmatic platforms allow measurement of the results of connected television campaigns with both digital and traditional metrics, including video completion rates. Growing audience targets millennials and the growing population who do not use cable television, also known as "cord cutters."

Connected television advertising is becoming a powerful open platform that caters directly to a variety of new applications and services to homes, mainly for the young, middle-aged, and older adult population. Such a robust, tech-savvy audience represents incredible marketing opportunities with brands continuously seeking metrics to target specific advertising to viewers. Similar to other video advertisements, connected television advertisements may be pre-roll or mid-roll. Pre-roll ads are those shown before content and mid-roll are those shown in the middle of content. Considering most ads on Smart TVs are un-skippable and users are highly engaged (having carefully selected content they are most interested in viewing), connected television advertisements are extremely effective. Moreover, connected television ads are far more measurable than traditional television advertising. With access to data, advertisers can quickly adjust their strategy based on what has or hasn't been working for their campaigns.

There is a need in the industry for continuous improvements to optimize the advertising experiences for viewers.

SUMMARY

The present technology overcomes the deficiencies and limitations of prior systems and methods, at least in part by, providing a scientific approach implemented in a system and methods for optimizing connected television ("CTV") and over-the-top ("OTT") advertising.

This scientific approach is implemented by digital advertising functionalities for television in a buying and attribution platform that facilitates self-serve solutions that combine fully optimized media buying with comprehensive measurement and attribution. The present invention introduces these functionalities in a demand-side platform that optimizes advertising in the connected television ("CTV") and over-the-top ("OTT") environment.

The demand-side platform ("DSP") is a dynamic platform that uses this scientific approach and is referred to a Scientific demand-side platform or DSP throughout this application. It comprises one or more computing architectures with processors that are distributed and integrated across networks to create a programmatic advertising flow including: 1) a first development phase during which the demand-side platform gathers data on multiple TV creatives focusing on creative attributes that drive performance of advertisements displayed during social media interactions (e.g., Facebook advertisements). It should be recognized by those skilled in the art that creative is one of the many levers to optimize TV campaigns for advertiser targeted outcomes. In most implementations, the outcomes are critical.

The Scientific demand-side platform captures this data by cataloging Facebook advertisement library ads stack, ranked by which ads drive the best social engagement metrics (e.g., likes, views, completed views, clicks, shares) for a given category/vertical or advertiser within a category (publically available). It should be recognized that the "Ad Library" is a place where anyone can search for ads that are running across Facebook Products. It can be used to get information about the ads that are seen. For example, for ads that are on issues, elections or politics, anyone can search for ads that are active or inactive (no longer running across Facebook Products). The Ad Library also displays Page creation dates, mergers with other Pages, Page name changes and where a Page is managed from, and the option to report an ad for policy violations—all of which is visible and transparent on a new Page Transparency tab on all Pages. Users can search "issue" ads by keyword or other ads by Page name, and Facebook will lend a hand with auto-fill suggestions and previous searches.

The Scientific demand-side platform comprises an artificial intelligence ("AI") engine with intelligent engines or modules configured and programmed to identify the common attributes that drive performance on the ads displayed during social media interactions. In accordance with some embodiments of the present invention, the Scientific demand-side platform's AI Engine includes an "initial-feedback" engine that develops and refines creatives or outcomes using artificial intelligence with machine learning and social media platforms, such as Facebook, as an initial feedback loop. It also includes an "ad-selection" engine that considers and obtains the highest performing social media ("SM") or Facebook ad and moves it to the connected television environment. The Scientific demand-side platform also comprises a "performance engine" configured to optimize for performance on connected television and then move the winning combination of creative or outcome+app inventory+audience segment+day part+frequency to linear TV buys.

It should be recognized that these intelligent AI engines have modules that gather the relevant data (structured and unstructured), prepare and organize the data, train models (using neural networks), test the data, and improve it for application.

The common attributes that are analyzed for performance include, but are not limited to, the "frame rate," "aspect ratio," "ethnicity of actor," "color scheme," when the brand is introduced, live action vs animation, or the like.

The Scientific demand-side platform executes the scientific approach through a second measurement phase, which measures results. Once multiple creatives or outcomes are produced, the Scientific demand-side platform tests each creative or outcome on the social media platform (e.g., Facebook) and measures the results. The Scientific demand-side platform executes the third step in the scientific process, which is the iteration step. As the Scientific DSP learns which attributes or combinations or attributes drive performance, new ad creatives or outcomes are developed based on feedback that considers the factors that drove the best performance on the social media platform (e.g., Facebook).

The Scientific demand-side platform executes the fourth step, which involves moving the winning creatives or outcomes of the social media (e.g., Facebook) ads to the connected television landscape and measure performance against audience segments, apps, day parts, etc. The Scientific demand-side platform executes the fifth step again by executing measures, including by refining the connected television buy based on, the "best performing" creative or outcome+ad execution. By "best performing," the Scientific demand-side platform focuses on advertiser outcomes (website visits, conversions, app downloads, form fills, etc.). The sixth step executes when the connected television buys are refined, at which point, the Scientific demand-side platform uses the highest performing attributes from the connected television to inform linear TV buys at a much larger scale.

The system and methods disclosed below may be advantageous in a number of respects. They provide a novel approach to optimizing television advertising.

BRIEF DESCRIPTION OF THE DRAWINGS

The present invention is illustrated by way of example, and not by way of limitation in the figures of the accompanying drawings in which like reference numerals are used to refer to the same or similar elements.

DETAILED DESCRIPTION

Figure 1A:
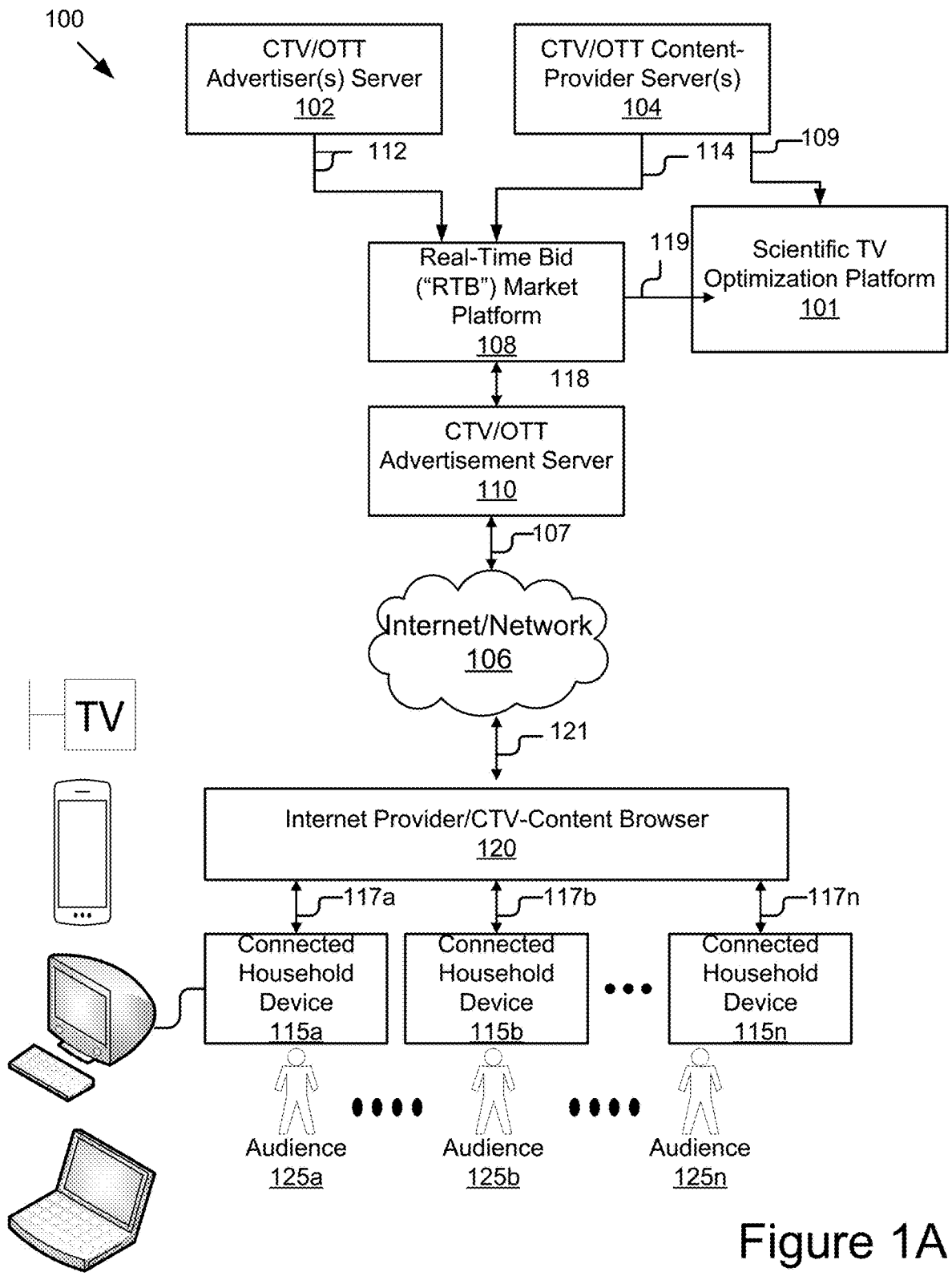
FIG. 1A is high-level block diagram, illustrating an example system and example CTV/OTT advertising environment in which the Scientific demand-side platform according to some implementations of the present technology integrates with other systems in the CTV advertising environment and operates.

The systems and methods of this technology with a scientific approach are configured to be implemented in a demand-side platform ("DSP") for connected television ("CTV") advertising. A typical demand-side platform integrates with multiple sources such as DMPs, ad exchanges, supply sources etc., in an infrastructure that provides secure, elastic, compute capacity in the "cloud" that comprises computers from Virtual Machines and Bare Metal servers to HPC (High Performance Computing), GPU (Graphics Processing Unit), container orchestration and management etc. A demand-side platform is typically integrated in three phases, the first, involving research and set up. The second phase is the development stage and the final phase is testing the integration. Demand-side platforms typically support cross-channel platforms and integrate with all the main ad exchanges. The bidding process is one of the key features of a demand-side platform. This is performed by a component called "bidder" which is responsible for placing bids on inventory during real-time bidding auctions. Usually, multiple bidders will be there to manage all real-time demands simultaneously. An Ad Server is an essential tool for creative or outcome management and for storing an ad creative or outcome and displaying to a user/viewer when required. Some demand-side platforms have their own ad servers while others may connect to external ad servers depending on the architecture. A campaign tracker helps to record the data regarding the performance of a particular campaign. The data includes clicks, impressions and spends. Once the data is recorded, it will be transferred to the reporting dashboard. The campaign tracker helps the user/viewer to determine the performance of a particular campaign. A reporting database stores all the data received from the campaign tracker. Users/viewers can generate reports by making use of this information. User/viewer data is an important part of the demand-side platform, which helps in processing and storing important information about the user/viewer/audience. User/viewer data may include information regarding buying habits, interests, age groups, demographic details etc. Marketers can make use of this information to improve the effectiveness of their campaigns and bring in better results. A user interface is the dashboard where the marketers work on creating, managing and optimizing their campaigns. Ads in demand-side platform are sold in a few ways, depending on the demand-side platform. Demand-side platform specifically built for performance campaigns such as app-installs, charge a fee based on cost per install ("CPI") or cost per view ("CPV") for video advertising campaigns. Prices of ad impressions in demand-side platforms are determined by a real-time bidding ("RTB") process, that takes place within milliseconds, as a user loads content or interacts with an application.

Demand-side platforms are unique as they offer the same capabilities as what ad networks used to provide, with an addition to a suite of audience targeting options. The advantage of demand-side platforms over ad networks is that they provide advertisers with the ability to do real-time bidding on ads, serve ads to a multitude of platforms, track and optimize—all under a single interface. Some targeting options offered by a demand-side platform include—demographic targeting (e.g., targets based on demographic features such as age (or age group), job title, gender, education etc.), device targeting (e.g., shows viewers advertising on specific devices to improve the personalization), re-targeting (e.g., targeting existing customers) and so on. Demand-side platforms are also used for retargeting campaigns. This is possible because they are able to manage large volumes of ad inventories and recognize ad requests with an ideal target audience, targeted by the advertiser.

The Scientific demand-side platform in accordance with the present invention offers a self-serve platform, which is an excellent way for businesses and individuals to manage ad campaigns. This offers targeting, bidding, budgeting and optimizing of ad campaigns. A demand-side platform can integrate with a data management platform ("DMP") that stores audience data, usually coming from multiple sources. It allows advertisers to create target audiences for their campaign based on 1st party and 3rd party audience data. A data management platform acts as a single platform that consolidates online and offline data from various advertisers, creating demographics, behavioral and affinity segments which are then used as targeting options in digital advertising. Performance data from live campaigns are then fed back into the demand-side platform, improving the accuracy of the data. Data management platform allow advertisers to reach their specific target markets while reducing wastage in advertising. A demand-side platform provides global reach and effective targeting in a dynamic environment. Through the present demand-side platform, advertisers can connect to different segments of audiences by applying various targeting criteria.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus for performing the operations described. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present technology may take the form of an entirely hardware embodiment, an entirely software embodiment or an implementation containing both hardware and software elements. In some implementations, this technology is implemented in software, which includes but is not limited to, firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used with programs in accordance with the specific teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages, for example, high level programming languages such as "C," "Java," "Pascal," or "Python," may be used to implement the teachings of the technology as described herein. The computers are specially programmed, and configured with special purpose hardware containing special programs. Each computer may have a single processor, a multiprocessor or may comprise multiple computers, each of which may include a single processor or a multiprocessor, operably connected over a computer network. Each computer is controlled by one of a variety of operating systems including Microsoft Windows, Macintosh, Linux, Unix, or a Java-based operating system, to name a few.

Each computer in the system may include one or more input and output (I/O) unit, a memory system, and one or more processing units. The input-output ("I/O") units of each computer may be connected to various input/output devices, such as a mouse, keyboard, video card (video monitor), sound card (with speakers), network card and printer. The memory system in a typical computer system usually includes a computer readable and writeable non-volatile recording medium, of which a magnetic disk, a flash memory and tape are examples. The memory system operably holds the operating system, utilities, and application programs. It should also be understood the invention is not limited to the particular input devices, output devices, or memory systems used in combination with the computer system or to those described herein. Nor should the invention be limited to any particular computer platform, processor, or high-level programming language.

System Architecture Overview

FIG. 1A illustrates a block diagram of a Scientific demand-side platform 101 illustrated in a connected television/over-the-top digital advertisement ("ad") placement environment 100 in which the disclosed implementation of the Scientific demand-side platform is operable. The environment 101 includes: an online advertiser server or website 102 (representing one or more online advertisers), an online content server or website 104 (representing one or more online content providers), a network 106, and a real-time bidding ("RTB") market platform 108. The online advertiser server 102 may be a computing system (of one or more computers or processors, either linked or distributed) that submits bids to the real-time bidding market platform 108 to purchase content-provider inventory and have advertiser advertisements shown in the connected television or over-the-top television environment. The advertiser server 102 is illustrated as coupled to the real-time bidding market platform 108 via signal line 112 and the content server is illustrated as coupled to the real-time bidding market platform 108 via line 114. The content server 104 may be a computing system that maintains content for televising that attracts viewers and contains placeholders for ads (from the ad inventory) that are submitted to the real-time bidding market platform 108, for sale to advertisers. The content server 104 has access to data provided by the connected television audience responsiveness analytics index, either directly (not expressly illustrated in FIG. 1) or otherwise.

The real-time bidding market platform 108 may be a computing system that provides a real-time bidding market that allows advertisers to bid on provider inventory in real-time. While only a single advertiser server 102, a single content server 104 and a single network 106 are shown in FIG. 1, it should be recognized that there may be thousands or even millions of advertiser servers 102, content servers 104, or networks 106 that integrate in a programmatic advertising environment. FIG. 1A is merely provided as one example illustration of the systems 102, 104, and 106, which present the environment in which the present technology may be implemented.

The advertiser server 102 is coupled by signal line 112 for communication with the real-time bidding market 108. Although not explicitly shown in FIG. 1A, it should be recognized that any and all the signal lines illustrated in FIG. 1A may route, via the network 106, as illustrated in FIG. 1A. The advertiser 102 is coupled to the real-time bidding market 108 to send bids on impressions, and also provides advertisement content, advertising target information, price, or any other information related to the impression or necessary to serve the ad on streaming content. The real-time bidding market platform 108 is a real-time bidding market, which allows advertisers to bid on inventory in real-time.

The content site 104 is a computing device for providing any type of video content for viewing as streamed content on a household or related device. The signal line 114 provides information to the real-time bidding market platform 108 about which impressions on the content site are available for the real-time bidding market platform 108. A control line 109 from 104 to 106 indicates content provision from the online content servers.

The network 106 is a conventional type, wired or wireless, and may have any number of configurations such as a star configuration, token ring configuration or other configurations known to those skilled in the art. Furthermore, the network 106 may comprise a local area network ("LAN"), a wide area network ("WAN") (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service ("SMS"), multimedia messaging service ("MMS"), hypertext transfer protocol ("HTTP"), direct data connection, WAP, email, etc.

The real-time bidding market platform 108 is coupled by signal line 118 to an advertisement server 110, which serves ads, for example video ads. The ad server 110 is software that receives requests for ad units, submits, and then fulfills those requests with content. The advertisement server 110 is coupled to the network 106 for communication and interaction with online advertisers 102 and the content site 104. A viewer (audience) 125 who is viewing streamed content is a potential consumer of ads. There may be any number of viewers (audience) 125a, 125b, through 125n, who are coupled via the network 106 to online sites 104 from which content may be streamed. For example, when a viewer in the audience (125a-125n) downloads content for viewing that is supplied by an online content site 104, requests are sent to the content site 104 (the content provider's server) for content. The viewer (125a-125n) navigates to content for streaming via a web browser 120. The browser may be any one of Chrome, Safari, Firefox, Internet explorer or the like.

The content site (provider) serves up the content, which includes executable JavaScript tags. Once these tags are loaded in the viewer's content browser 120 (via lines 117a, 117b, through 117n), they are executed (via lines 121 and 107) and notify the ad server 110 that there is an impression that needs filling in the streaming content. The impression is then submitted to the real-time bidding ("RTB") market platform 108, where advertisers bid to fill the impression with their video advertisements. The real-time bidding market platform 108 reads in the market floors for each of the competing advertisers and uses these market floors, along with the advertiser bids, to determine the winner of the auction and their clearing price. In the event that all of the received bids are too low, the Auction may not clear. The operation of the real-time bidding market platform 108 is described in more detail below with reference to FIG. 2.

Figure 1B:
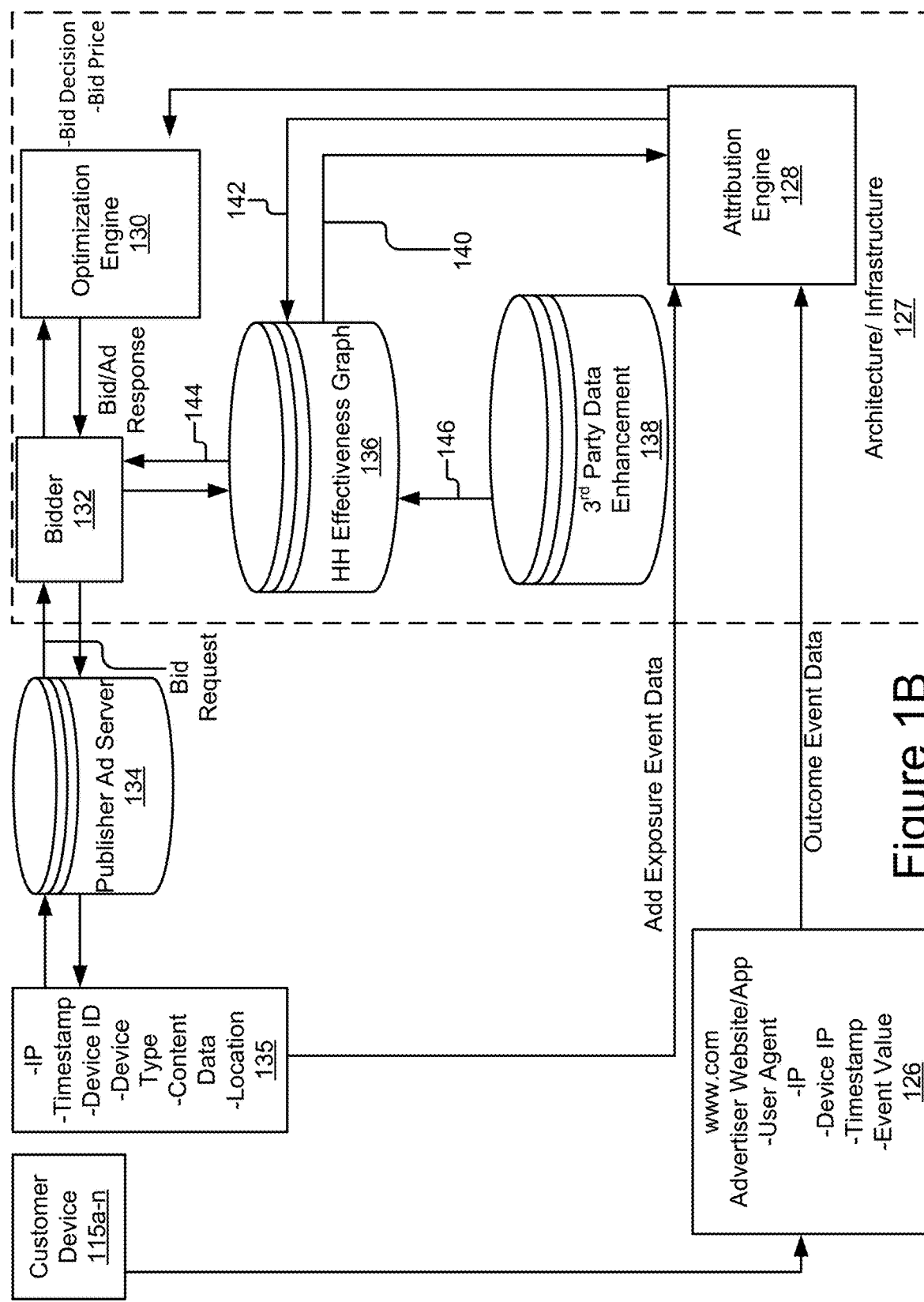
FIG. 1B is a high-level block diagram illustrating the infrastructure and architecture of the example system with the flow of event and outcome data.

Referring now to FIG. 1B, the architecture of the optimization process is explained in greater detail. FIG. 1B illustrates the architecture and flow of event data, in which the customer device 115a-n may access an advertiser website/app (e.g., www.com) designated by reference numeral 126, at which point, the event and related data is generated and recorded as "outcome event data." The outcome event data in some embodiments of the present invention may include the "User Agent," the "IP address," the "Device IP," a "Timestamp," or an "Event Value." The infrastructure or architecture of the platform 127 includes an attribution engine 128, to which the outcome event data is continuously provided. In some instances, the outcome event data may be provided at designated intervals determined by the platform. The attribution engine 128 is coupled to an optimization engine 130, which provides a bid decision and bid price to the bidder 132. As illustrated, the bidder provides a bid or ad response to the publisher ad server 134 when a bid request is received by the bidder 132. Ad Exposure Event data is continuously tracked and recorded as each bid request is generated. For example, event data that may be recorded includes the "IP," a "Timestamp," a "Device ID," a "Device Type," "Content Data," "Location," or the like compiled at a storage location designated by reference numeral 135. A household ("HH") effectiveness graph 136 is coupled to the bidder 132 and serves to provide additional data from a 3rd Party Data Enhancement server 138 as designated by signal line 146. Examples of the additional data may include, but not limited to, postal data, latitude/longitude data, IP type, age, gender, and household income. In addition, new IDs are linked to known households and provided to the attribution engine 128, as designated by signal line 140. And, the attribution engine 128 adds new results to known or new households, as designated by signal line 142. The household effectiveness graph 136 enhances bid requests with additional data as designated by signal line 144.

Figure 2:
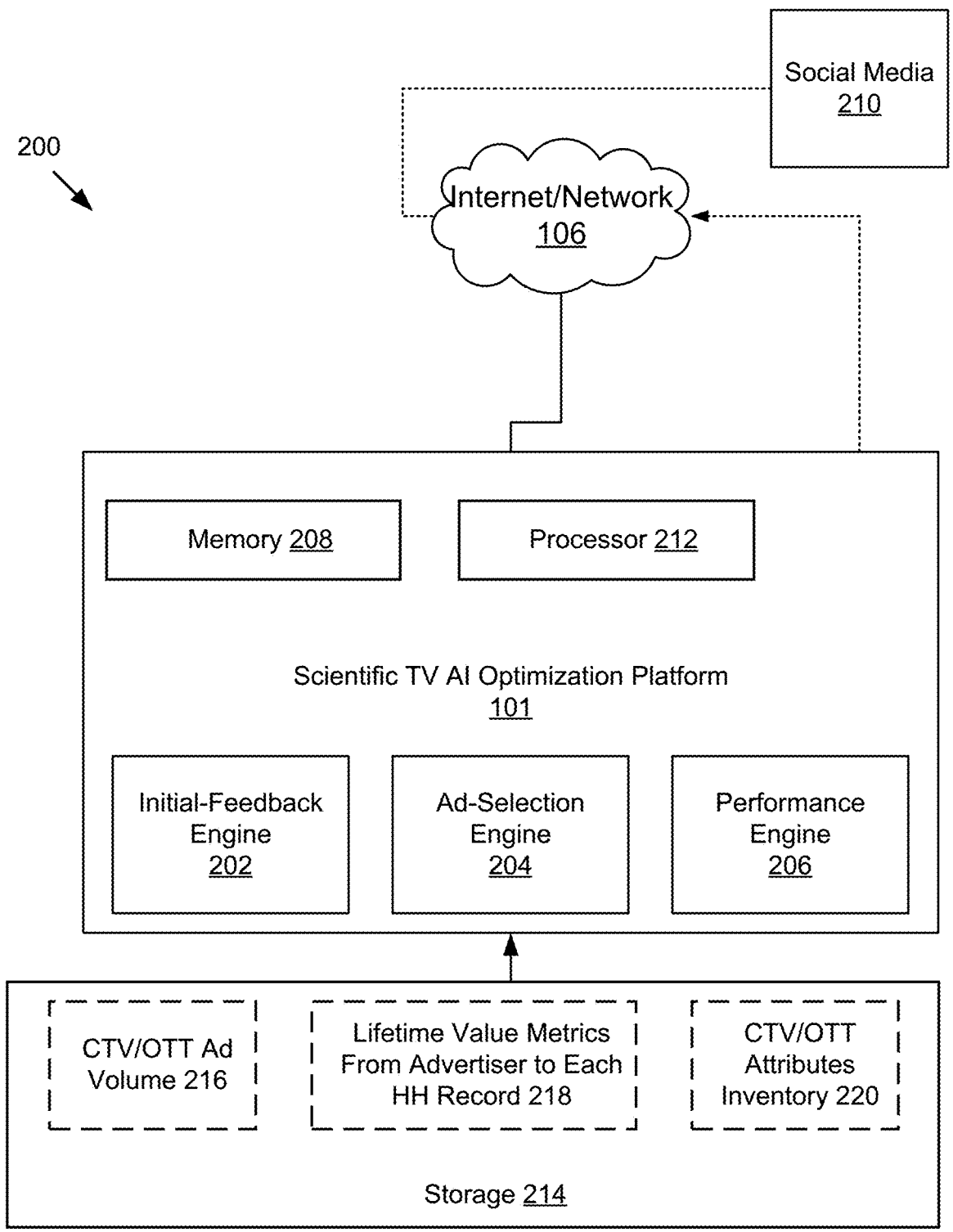
FIG. 2 is a high-level block diagram, illustrating an example Scientific demand-side platform, configured to operate with a market floor engine and auction event store operating a floor auction for CTV ad placement.

Referring now to FIG. 2, the Scientific DSP approach designated by reference numeral 200 here, includes the Scientific DSP configured for optimization and designated by reference numeral 101 (as in FIG. 1A). It comprises an AI engine with intelligent engines or modules configured and programmed to identify the common attributes that drive performance on the ads displayed during social media interactions. In accordance with some embodiments of the present invention, the Scientific DSP's AI Engine includes an "Initial-Feedback" engine 202 that develops and refines creatives using artificial intelligence with machine learning and social media platforms, such as Facebook (see 210, connected by a network 106), as an initial feedback loop. It also includes an "Ad-Selection" engine 204 that considers and obtains the highest performing social media ("SM") or Facebook ad and moves it to CTV. The Scientific DSP also comprises a "Performance" engine 206 configured to optimize for performance on CTV and then moves the winning combination of creative or outcome+app inventory+audience segment+day part+frequency to linear TV buys.

Figure 3:
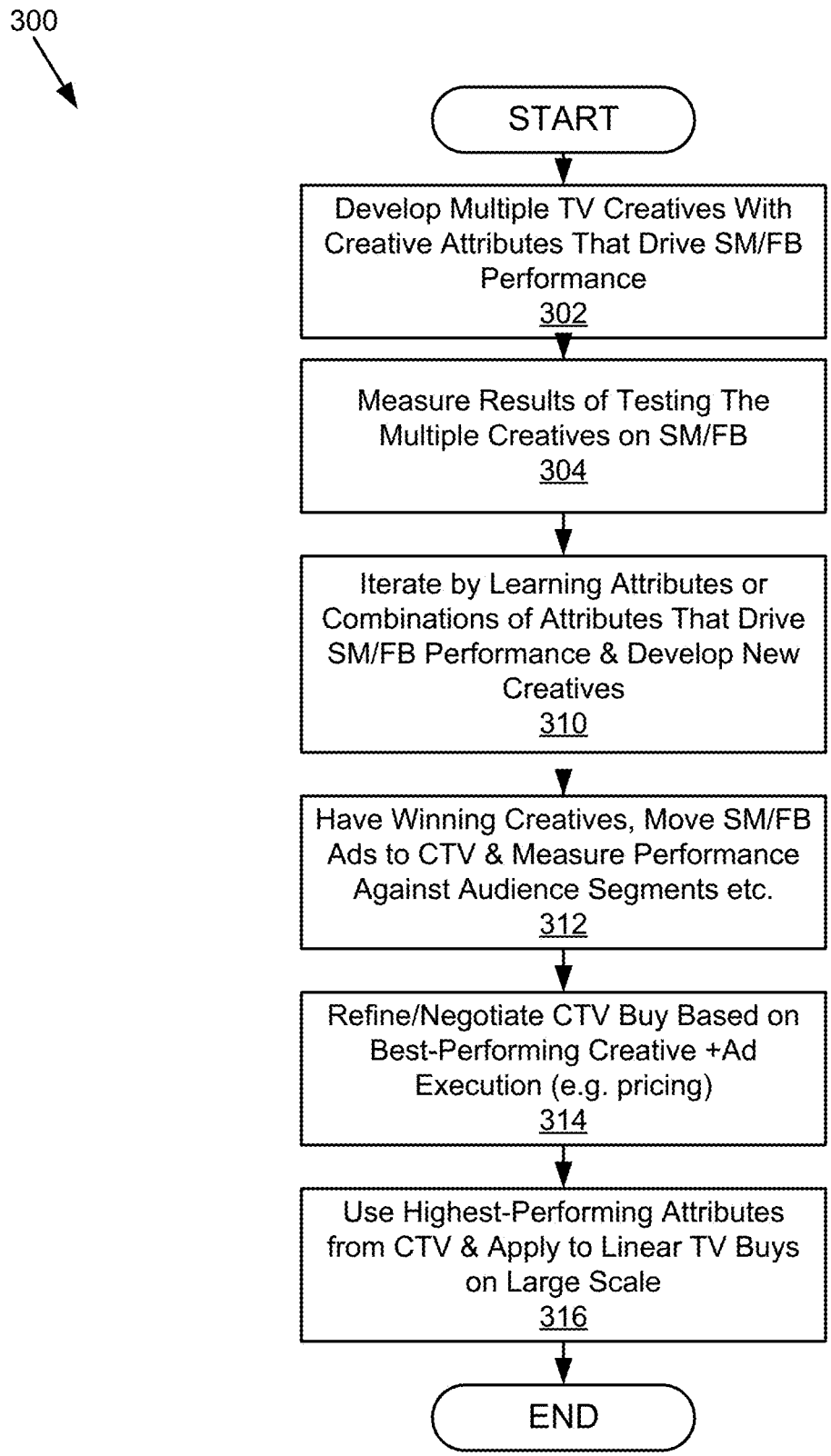
FIG. 3 is a flow chart representing an example method including operations for executing the Scientific approach by the Scientific demand-side platform.

Referring also to FIG. 3, an example implementation of the Scientific DSP is illustrated. This implementation of Scientific DSP and its scientific approach designated generally by reference numeral 100 (FIG. 1A) comprises data collection and execution engines. These engines are operated by one or more processors 212 (FIG. 2) that comprise an arithmetic logic unit, a microprocessor, a general-purpose controller or some other processor array to perform particular computations as programmed and provide electronic display signals to a display device. The processor 212 is coupled to a bus for communication with the other components. The processor 212 processes data signals and may comprise various computing architectures including a complex instruction set computer ("CISC") architecture, a reduced instruction set computer ("RISC") architecture, or an architecture implementing a combination of instruction sets. Although only a single processor 212 is referenced here, multiple processors 212 may be included. It will be obvious to one skilled in the art that other processors, operating systems, sensors, displays and physical configurations are possible.

The processor 212 is coupled to a memory 208 that stores instructions and/or data that may be executed by the processor 212. The memory 208 is coupled to the bus for communication with the other components. The instructions and/or data may comprise code for performing any and/or all of the techniques described herein. The memory 208 may be a dynamic random-access memory (DRAM) device, a static random-access memory (SRAM) device, flash memory or some other memory device known in the art.

In one embodiment, storage 214 stores data, information and instructions used by ad request and delivery engines, data collector engines, optimization engines, and the direct request of source (from provider) by User/Viewer/Agency etc. The storage 214 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The data storage 214 is coupled by the bus for communication with other components of the system for impression or outcome evaluation and allocation.

One or more of the engines are software or routines executable on the processor. In some implementations, one or more of the engines store data that, when executed by the processor, causes the collectors/modules to perform the operations described below. In yet other implementations, one or more of the engines are instructions executable by the processor to provide the functionality described in the flow charts that follow. In still other implementations, one or more of the delivery engines are stored in the memory and are accessible and executable by the processor. The flow chart illustrated in FIG. 3 shows the execution protocol by the Scientific demand-side platform.

The Scientific demand-side platform comprises an artificial engine with intelligent engines or modules created, configured and programmed to identify and track the common attributes that drive performance on the ads displayed on social media platforms during social media interactions.

In accordance with some embodiments of the present invention, the Scientific demand-side platform's artificial engine includes an "initial-feedback" engine (202 in FIG. 2) that develops and refines creatives or outcomes using artificial intelligence with machine learning and social media platforms, such as Facebook, as an initial feedback loop. It also includes an "ad-selection" engine (204 in FIG. 2) that considers and obtains the highest performing social media ("SM") or Facebook ad and moves it to the connected television ("CTV") or OTT delivery mechanisms. The Scientific demand-side platform also comprises a "performance engine" (206 in Figure) configured to optimize for performance on CTV and then moves the winning combination of creative or outcome+app inventory+audience segment+day part+frequency to linear TV buys.

It should be recognized that these intelligent artificial engines have modules that gather the relevant data (structured and unstructured), prepare and organize the data, train models (using neural networks), test the data, and improve it for application.

The common attributes that are analyzed for performance include, but are not limited to, the "frame rate," "aspect ratio," "ethnicity of actor," "color scheme," when the brand is introduced, live action vs animation, or the like.

FIG. 3 illustrates the flow of the process for developing multiple TV creatives or outcomes into creative or outcome attributes that drive social media (e.g., Facebook) performance by block 302.

The Scientific demand-side platform executes the scientific approach through a second measurement phase, which measures results, illustrated by block 304. Once multiple creatives or outcomes are produced, the Scientific demand-side platform tests each creative or outcome on the social media platform (e.g., Facebook) and measures the results. The Scientific demand-side platform executes the third step in the scientific process, which is the iteration step, illustrated by block 310. As the Scientific demand-side platform learns which attributes or combinations or attributes drive performance, new ad creatives or outcomes are developed based on feedback that considers the factors that drove the best performance on the social media platform (e.g., Facebook).

The Scientific demand-side platform executes the fourth step including one or more operations, which involve moving or directing the winning creatives or outcomes of the social media (e.g., Facebook) ads to CTV and measure performance against audience segments, apps, day parts, etc. These operations are illustrated by block 312. The Scientific demand-side platform executes the fifth step again by executing measures, including by refining the CTV buy based on, the "best performing" creative or outcome+ad execution. By "best performing," the Scientific demand-side platform focuses on advertiser outcomes (website visits, conversions, app downloads, form fills, etc.). The operations at this stage are illustrated by block 314. The sixth step executes when the CTV/OTT buys are refined or negotiated, at which point, the Scientific demand-side platform uses the highest performing attributes from CTV/OTT to inform linear TV buys at a much larger scale. The operations at this stage are illustrated by block 316. It should be recognized that this step includes negotiations on pricing.

The system and methods disclosed below may be advantageous in a number of respects. They provide a novel approach to optimizing TV advertising. As illustrated in FIG. 2, the storage 214 in some embodiments of the present invention compiles lifetime value metrics from advertisers to each household record that is created. In addition, the extent and level of ad exposure may be determined by tracking different events and data. For example, ad exposure is determined, either by sequence of ad displayed, by frequency of advertising or by cross-channel exposure. In some embodiments, advertising campaigns may be adjusted based on many variables. For example, in some instances advertising campaigns may be adjusted based on the application, the creative formats, sizes, and elements. In other instances, advertising campaigns may be adjusted based on the advertisement length, the frequency, and cross-screen frequency and sequencing. For example, connected television before a tablet or a tablet before connected television. In yet other instances, advertising campaigns may be adjusted based on creative sequencing or first-party data targeting. In some instances, advertising campaigns may be adjusted based on "lookalike" or similar audience building or third-party data segments, context, and Automatic Content Recognition ("ACR") data.

Figure 4:
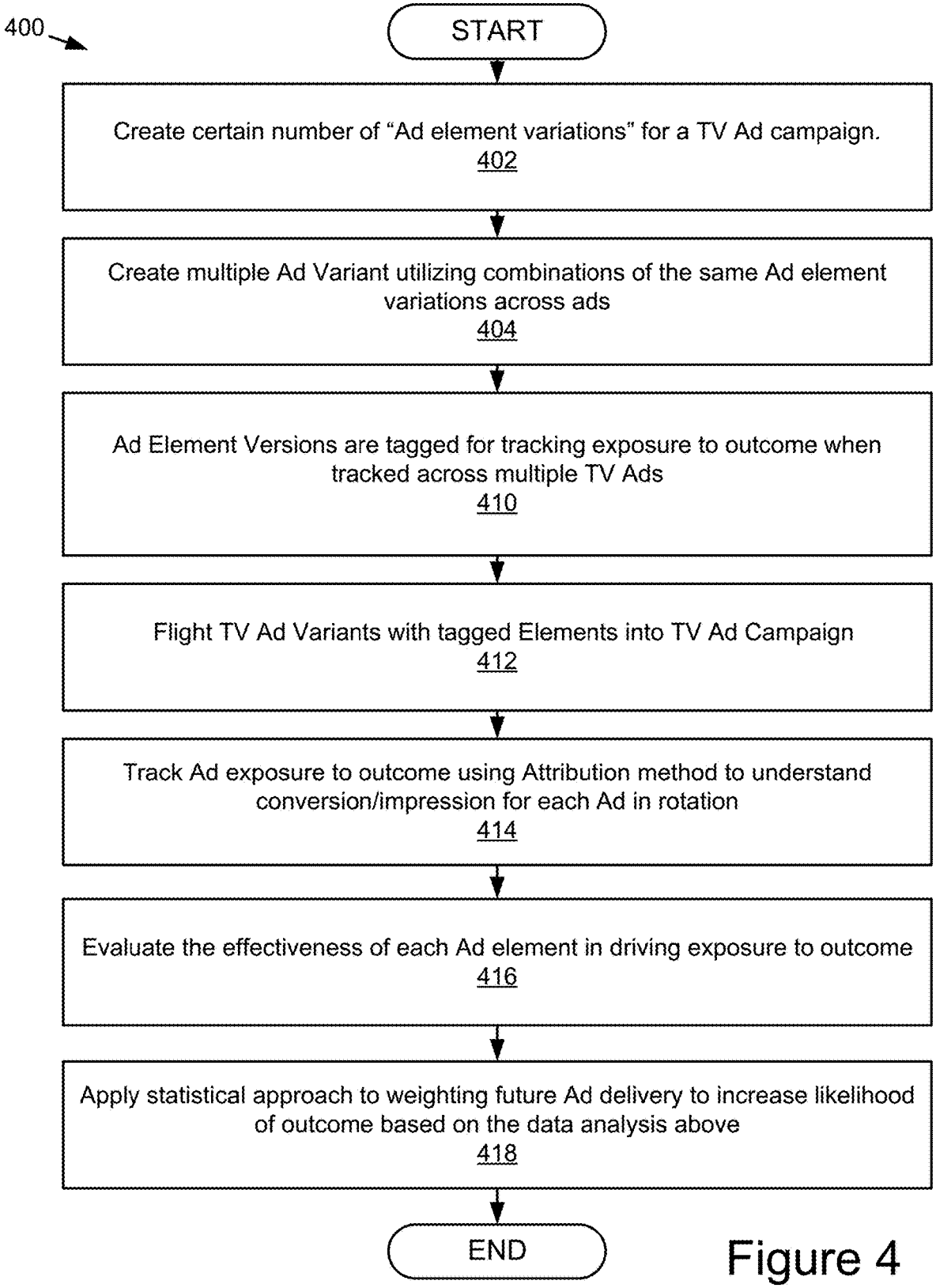
FIG. 4 is a flow chart representing an example testing and optimization process for television advertisement creative variants.

Referring now to FIG. 4, a television advertisement creative variant testing and optimization process is described. It should be understood that a television advertisement ("TV AD") refers to a television creative object, for example a :15, :30, or :60 second unit comprising multiple advertisement elements. As should be recognized by those skilled in the art, an advertisement element is a component of the television advertisement that is being tested, for example, an actor's sex, a voiceover style, an offer type, a quick response code ("QR"), a video style or the like. It should also be recognized by those skilled in the art that a television advertisement variant refers to a versioning of a television advertisement that is composed of different versions of the advertisement elements.

The method 400 illustrated in FIG. 4 begins and proceeds to block 402 including one or more operations for creating a certain number of advertising ("ad") element variations for a particular television advertising campaign. It should be recognized that the variants represent differing treatments of the same components of an advertisement, for example, an actor's sex, a voiceover type, a presence of an offer, placement and/or treatment of a quick response ("QR") code, or other variation in the advertisement. The method 400 proceeds to the next block 404, including one or more operations for creating multiple advertisement variants utilizing combinations of the same advertising element variations across multiple advertisements. The process 400 proceeds to the next block of operations 406, including one or more operations for tagging advertising element versions for tracking exposure to "outcome" when tracked across multiple television advertising. In some instances, for example, a particular television advertisement—"TV AD 1" has "$Sex_1$"—"$VoiceOver_2$," and "$Offer_3$." As yet another example, another TV AD 2 has "$Sex_2$,"—"$VoiceOver_1$," and "$Offer_2$," and so on across nine television advertisements that shuffle three versions of each advertising element. The method 400 continues to the next block of operations 408, including one or more operations for flighting television advertising variants with tagged elements into a television advertising campaign. As recognized by those skilled in the art advertising flight describes the time when commercials or advertising is aired. The method 400 proceeds to the next block of operations designated by reference numeral 410, including one or more operations for tracking advertising exposure to a particular outcome using the attribution method in accordance with the present invention to understand conversion/impression for each advertisement in rotation. As recognized by those skilled in the art, conversion refers to an action that is counted when someone interacts with advertising or a free product listing (for example, clicks a text ad or views a video advertisement) and then takes an action that is defined as valuable to the advertiser's business, such as an online purchase or a call to the advertiser's business from a mobile phone. The method 400 proceeds to the next block 412, including one or more operations for evaluating the effectiveness of each advertisement element in driving exposure to outcome by applying a statistical approach to determine incremental increase in outcome rate for the presence of each element. In some embodiments, a "Shapley Value Weighting" approach is used to fairly attribute contribution to the end result of an outcome. As is recognized by those skilled in the art, the "Shapley" value is one of the most widely used measures of feature importance partly as it measures a feature's average effect on a model's prediction. By using joint Shapley values, which directly extend Shapley's axioms and intuitions, a set of features' average contribution to a model's prediction are measured by the joint Shapley values. Joint Shapley values present different insights from existing interaction indices, which assess the effect of a feature outcome within a set of features. The joint Shapley values provide intuitive results in machine learning attribution problems.

The method 400 proceeds to the next block of operations, including one or more operations for applying a statistical approach to weighting future advertisement delivery to increase the likelihood of an outcome based on the data analysis in the preceding operations.

In the description here, for purposes of explanation, numerous specific details are set forth in order to provide a thorough understanding this technology. It will be apparent, however, that this technology can be practiced without some of these specific details. In other instances, structures and devices are shown in block diagram form in order to avoid obscuring the innovative aspects. For example, the present technology is described in some implementations above with reference to particular hardware and software, yet it is not limited to only the particular hardware and software referenced.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present inventive technology be limited not by this detailed description, but rather by the claims of this application. As will be understood by those familiar with the art, the present inventive technology may be embodied in other specific forms without departing from the spirit or essential characteristics thereof. Likewise, the particular naming and division of the modules, routines, features, attributes, methodologies and other aspects are not mandatory or significant, and the mechanisms that implement the present inventive technology or its features may have different names, divisions and/or formats. Furthermore, as will be apparent to one of ordinary skill in the relevant art, the modules, routines, features, attributes, methodologies and other aspects of the present inventive technology can be implemented as software, hardware, firmware or any combination of the three. Also, wherever a component, an example of which is a module, of the present inventive technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present inventive technology is intended to be illustrative.

What is claimed is:

1. A computer-implemented method for training a neural network for optimizing placement of select advertising in streaming content, comprising:
    collecting different data sets for a plurality of different attributes to optimize media advertising and drive multiple performance outcomes, wherein the different data sets are for at least a size, a frequency of delivery in a given period, a channel or connected-television application, a placement, a sequence, a particular time-of-day of display of advertising, one or more previous website visitors, a third-party data segment, and an element within a tv creative;
    identifying at least one outcome, from the multiple performance outcomes, in the streaming content displayed on an external device;
    training a neural network in an initial phase with the different data sets;
    applying an initial feedback engine that provides feedback data collected on the different data sets and stored in a database;
    training the neural network in a subsequent phase, based on the feedback data on the different data sets stored in the database;
    obtaining the select advertising from one or more advertising sources based on outcomes defined by the neural network and delivering the select advertising to a connected-television and over-the-top delivery mechanism for displaying the select advertising within the streaming content; and
    generating a household effectiveness graph, wherein the household effectiveness graph provides additional data for optimizing delivery of the select advertising, including at least one of postal data, latitude or longitude data, IP type, age, gender, and household income.

2. The computer-implemented method of claim 1, further comprising:
    compiling lifetime value metrics from the one or more advertiser sources for each household record that is created for the household effectiveness graph.

3. The computer-implemented method of claim 1, further comprising: determining an extent and level of exposure of the select advertising.

4. The computer-implemented method of claim 1, further comprising: applying a processing algorithm for moving a winning outcome to the connected-television or the over-the-top delivery mechanism and measuring outcome performance against one or more audience segments.

5. The computer-implemented method of claim 1, further comprising: executing an additional operation including one or more measures that refine a subsequent action based on determining a best-performing outcome.

6. The computer-implemented method of claim 1, further comprising:
iterating, by learning combinations of certain attributes of the plurality of different attributes that drive performance and developing one or more new creatives.

7. The computer-implemented method of claim 1, wherein the streaming content is served by a provider via a content site, which includes an executable tag for loading on a viewer's content browser, wherein the executable tag requests advertising from an ad server, and wherein event data associated with the at least one outcome includes at least one of a user agent, an IP address, an IP value, a device IP, a timestamp or an event value.

8. The computer-implemented method of claim 1, further comprising:
continuously or at designated intervals, providing event data associated with the at least one outcome to an attribution engine, wherein the attribution engine adds new results to known or new households.

9. The computer-implemented method of claim 3, further comprising: tracking the level of exposure of the select advertising by determining a sequence of display, a frequency of advertising or by a cross-channel exposure.

10. The computer-implemented method of claim 5, further comprising:
determining one or more attributes of the best-performing outcome and applying the one or more attributes to linear TV.

11. A system, for training a neural network for optimizing placement of select advertising in streaming content, comprising:
a processor;
a memory storing executable code, wherein the executable code drives the processor to:
collect different data sets for a plurality of different attributes to optimize media advertising and drive multiple performance outcomes, wherein the different data sets are for at least a size, a frequency of delivery in a given period, a channel or connected-television application, a placement, a sequence, a particular time-of-day of display of advertising, one or more previous website visitors, a third-party data segment, and an element within a tv creative;
identify at least one outcome, from the multiple performance outcomes, in the streaming content displayed on an external device;
train a neural network in an initial phase with the different data sets;
apply a feedback engine that provides feedback data collected on the different data sets and stored in a database;
train the neural network in a subsequent phase, based on the feedback data on the different data sets stored in the database;
obtain the select advertising from one or more advertising sources based on outcomes defined by the neural network and delivering the select advertising to a connected-television and over-the-top delivery mechanism for displaying the select advertising within the streaming content; and
generate a household effectiveness graph, wherein the household effectiveness graph provides additional data for optimizing delivery of the select advertising, including at least one of postal data, latitude or longitude data, IP type, age, gender, and household income.

12. The system of claim 11, wherein lifetime value metrics from the one or more advertiser sources for each household record are compiled in a household record for the household effectiveness graph.

13. The system of claim 12, wherein the system determines an extent and level of exposure of the select advertising.

14. The system of claim 13, wherein the system tracks the level of exposure of the select advertising by determining a sequence of display, a frequency of advertising or by a cross-channel exposure.

15. The system of claim 12, wherein the system applies a processing algorithm for moving a winning outcome to the connected-television or the over-the-top delivery mechanism and measuring outcome performance against one or more audience segments.

16. The system of claim 12, wherein certain combinations of the plurality of different attributes that drive performance are learned by the neural network to develop one or more new creatives or outcomes.

17. The system of claim 15, wherein the system executes an additional operation including one or more measures that refine a subsequent action based on determining a best-performing outcome.

18. The system of claim 17, wherein the system determines one or more attributes of the best-performing outcome and applying the one or more attributes to linear TV.

19. The system of claim 16, wherein the streaming content is served by a provider via a content site, which includes an executable tag for loading on a viewer's content browser, wherein the executable tag requests advertising from an ad server, and wherein event data associated with the one or more new creatives or outcomes include at least one of a user agent, an IP address, an IP value, a device IP, a timestamp or an event value.

20. The system of claim 19, wherein the system further receives event data associated with the one or more new creatives or outcomes.

\* \* \* \* \*